INVENTOR.
DERK J. BOON
BY Robertson, Smythe & Bryan
ATTORNEYS

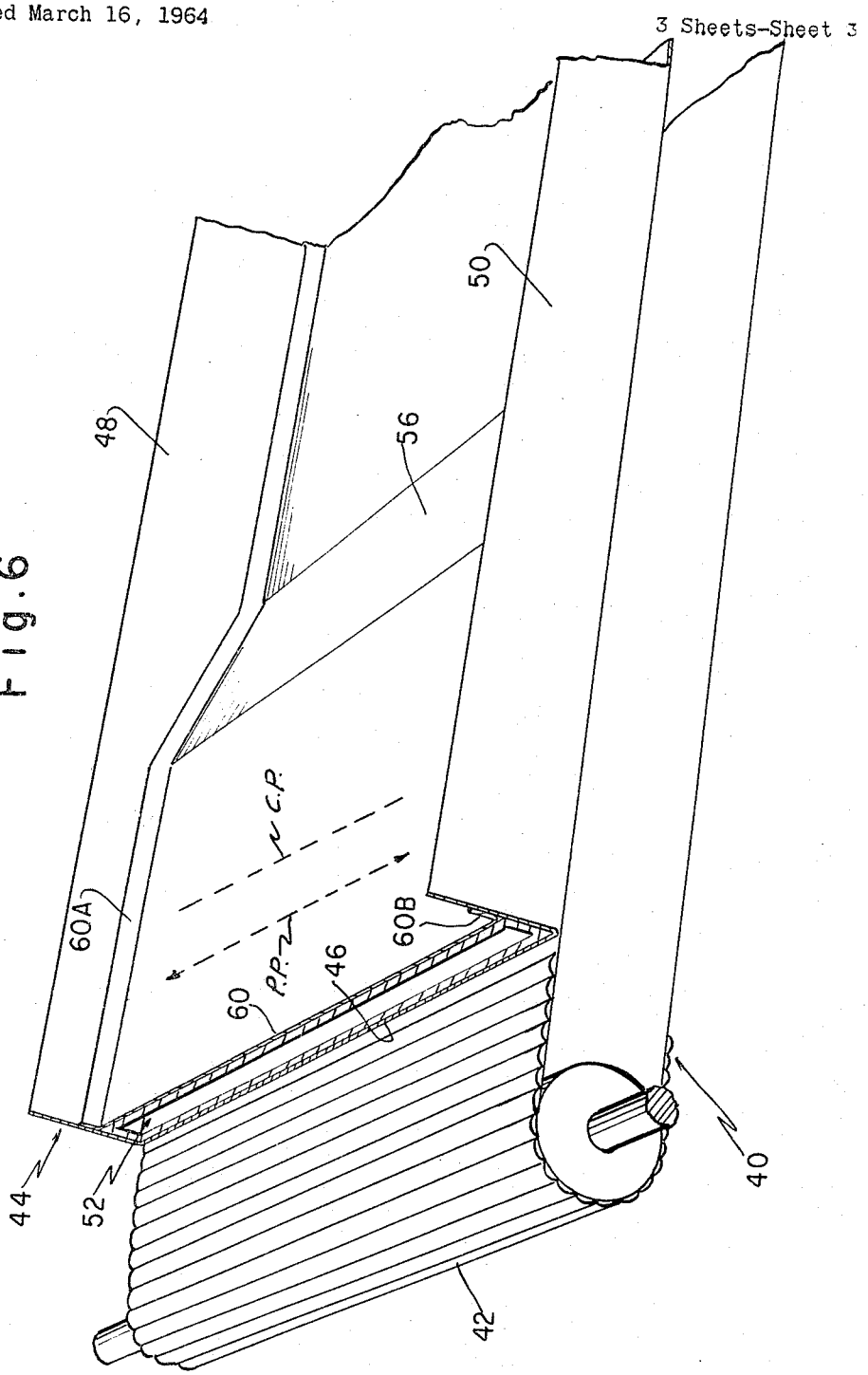

3,325,823
MANUFACTURE OF FOAM MATERIAL
Derk J. Boon, Charlotte, N.C., assignor to Reeves Brothers, Inc., a corporation of New York
Filed Mar. 16, 1964, Ser. No. 352,282
3 Claims. (Cl. 264—41)

This invention relates in general to a method and apparatus for the manufacture of a foamed material. More particularly, it relates to an improved method for manufacturing free rising polyurethane foam and the apparatus therefor to obtain a desired final top contour of the molded foam.

In manufacturing free rising polyurethane foam in either a four-sided mold or the continuous casting of a block of such foam in a U-shaped mold, the rising of the foam results in a crest or crown in much the same manner as a loaf of bread. This crown or crest portion of the foam forms something in the nature of a crust which is more densified than the interior of the block, and for the most part is unusable. Accordingly, it has been conventional practice to make as large a block as possible in order to reduce the percentage of the block that is occupied by the wasted crown.

As foamed polyurethane, both rigid and flexible types, are for the most part sold in definite dimensions which are the finished size of a block or multiple thereof, the crown portion of the blocks, due to their narrower width and height, become less saleable than the remaining portion of the block. Further, in order to gain whatever economic benefits can be had from the sale of such portions, the manufacturer must do considerable handling of the block to get the maximum yield of useable foam in the crest and thus his labor costs are increased.

It has long been recognized that the crown or crest of a foamed polyurethane block is undesirable because of the adverse effect on the fabrication yield. Accordingly, many attempts have been made to eliminate the crown. It has been proposed that one apply a pressure with a roll on the top of the foam slab immediately after the foam has reached its maximum rise. This method causes the top area of the foam to densify, and thus offsets whatever gain in yield there may be. Further, the roll is difficult to keep clean because of the great stickiness of the rising urethane.

Another method that has been attempted to reduce the crown is to pour more reaction liquid adjacent the sides of the mold than in the center. However, this has not eliminated the crown and results in a lower height of the slab in the center than at the sides.

The above attempts have been in the direction of compensating for the inherent crown that occurs when the polyurethane is molded.

An observation of the rising of polyurethane foam in a mold reveals that the edge or shoulder portion seems to rise at a slower rate than the center portion, and accordingly, an analysis revealed that the rise rate difference seemed to be caused by an increased drag of the wall of the mold on the rising foam. Accordingly, the present invention is based on causing and controlling relative movement between the rising foam and the containing side walls, so as to increase or decrease the drag on the foam adjacent the wall to thus obtain a desired top contour of the molded foam. Experiments show that if there is a zero movement between the wall and the top of the rising foam, approximately a flat top may be obtained. Further, if the wall is made to have a positive upward movement relative to the rising foam, one can obtain a concave contour of the top of the foam, and depending upon the portion of the rise period in which the positive movement is made, such movement at least causes a tendency for a concave contour to occur.

Moreover, it was found that the relative movement between the rising foam and the wall is most effective when done during the final two-thirds of the rise period of the foam.

The invention further provides that relative movement between the walls of the mold and the rising foam may be done in a continuously translating laterally moving mold path wherein the relative movement is controlled at various positions along the length of the foam rise path in relationship to the rise period of the foam.

The invention also contemplates a mold for the continuous foaming of free rising polyurethane in which there is a translatable U-shaped mold adapted to receive the liquid reaction products and contain them during the time period of their subsequent reaction and free rise to form solidified foam in which there are means for causing relative movements, in vertical direction relative to the base of the mold, between the walls of said mold and the laterally moving rising foam in some portion of the last two-thirds of the time period of foam rise.

Additionally, it is contemplated that the aforementioned improved U-shaped mold would have a portion of the walls of the mold located in the latter two-thirds of the time period of foam rise, and which are arranged to be translated at an acute angle to the base of said translating U-shaped mold.

The invention rests on the discovery that the free rise of polyurethane adjacent the boundary of the mold therefor is dependent upon the relative movement between the bounding wall and the rising portion of the urethane foam. Thus, if one causes the wall to move upwardly toward the top of the rising foam at a rate approximating the rise of the top, one can obtain a substantially flat top of the resulting risen foam. Further, if one causes a net positive upward rise, or in other words, causes the wall to move up faster than that of the rising foam, one can obtain a concave top of the resultant risen foam if the positive relative rise of the wall is continued until the end of the foam period. Additionally, it has been determined that relative to a stationary mold one can move the wall first downwardly during the foam rise and then upwardly in the latter portion of the foam rise and still control the contour of the top of the foam; the control of such contour being principally a result of the relative movement of the wall and the foam during the latter two-thirds of the time period of the foam rise.

For the purpose of this invention, the time period of foam rise is considered to be the time that elapses from the moment of mixing of the reacting products until the foam ceases vertical movement or expansion. All free rising polyurethanes have definite rise periods, whether they be of the polyester or polyether type, rigid or flexible.

Specific examples of the types of foams that may have their top contour controlled by the herein disclosed invention are as follows:

Example 1

A flexible polyether foam is prepared by substantially, uniformly, and continuously mixing together about 100 parts by weight of a polypropylene ether trihydric alcohol, having an average molecular weight of about 3,500 and a hydroxyl number of about 48 and prepared by condensation of propylene oxide with glycerine; about 45 parts by weight of a mixture of 80%, 2,4-tolylene diisocyanate and about 20%, 2,6-tolylene diisocyanate; about 3.6 parts of water; about .34 part of stannous octoate; about .07 part of triethylene diamine; about .2 part of N-ethyl-morpholine and about 1.2 parts of polysiloxane oxy alkylene block copolymers as surfactant.

The reaction mixture, prepared as described above, is poured at a rate of 40 lbs./minute per foot width, onto a pouring surface, covered with a mold paper which is moving away this reaction liquid continuously.

The reaction mixture prepared as described above will start expanding approximately 0.1 minute after mixing and this expansion will continue until approximately 1.5 minutes after mixing, resulting in a foam with a density of approximately 1.5 lbs./cu. ft.

*Example 2*

A flexible polyester foam is prepared by substantially, uniformly, and continuously mixing together about 100 parts by weight of a polyester prepared from 10 mols. of adipic acid, 16 mols. of diethylene glycol and 1 part trimethyl propane, having an OH # of approximately 56 and an acid number of about 1; about 48 parts by weight of a mixture of 80%, 2,4-tolylene diisocyanate and about 20%, 2,6-tolylene diisocyanate; about 3.8 parts of water; about .75 part of methyl ammonium oleate; about 1.7 parts of sulphonated castor oil; about 0.5 part of Armeen DM16D, a tertiary amine of the general formula

where $R_1$ is methyl and $R_2$ is a 16 carbon alkyl group (made by Armour Chemical Company); 0.6 part by weight of N-coco-morpholine and 2.0 parts of N-ethyl-morpholine. The reaction mixture, prepared as described above, is poured at a rate of 40 lbs./minute per foot width onto a pouring surface, covered with a mold paper which is continuously moving away this reaction liquid.

The reaction mixture, prepared as described above, will start expanding approximately 0.05 minute after mixing and this expansion will continue until approximately 1.1 minutes after mixing, resulting in a foam of approximately 1.7 lbs./cu. ft.

*Example 3*

A rigid polyether foam is prepared by substantially, uniformly, and continuously mixing together about 100 parts by weight of a polyether having an OH # of about 490, and prepared by the condensation of one mol. sorbitol to 10 mols. of propylene oxide; about 67 parts by weight of a mixture of 80%, 2,4-tolylene diisocyanate and 20%, 2,6-tolylene diisocyanate; about .7 part of NNN'N' tetramethyl 1,3 butane diamine; about .5 part of silicone oil and about 24 parts of trichlorofluoromethane.

The reaction mixture prepared as described above, is poured onto a pouring surface at a rate of 60 lbs./minute per foot width. The pouring surface is covered with a mold paper which is moving away this reaction liquid at a speed of approximately 10 feet/minute.

The reaction mixture prepared as described above will start expanding approximately 0.1 minute after mixing and will continue this expansion until approximately 1.0 minute after mixing, resulting in a foam of approximately 2.5 lbs./cu. ft. density.

*Example 4*

A rigid polyester foam is prepared by substantially, uniformly, and continuously mixing together about 100 parts by weight of a polyester having an OH # of about 504 and prepared by reaction of 5 mols. tri-methyl propane and 3 mols. of adipic acid, reacted to an acid number of about 1; about 67 parts by weight of a mixture of 80%, 2,4 tolylene diisocyanate and 20%, 2,6-tolylene diisocyanate; about .7 part of NNN'N' tetramethyl 1,3 butane diamine; about .5 part of silicone oil and about 24 parts of trichlorofluoromethane.

The reaction mixture will start expanding 0.1 minute after mixing and will continue this expansion until about 1.0 minute after mixing to result in a foam of about 2.5 lbs./cu. ft. density.

For a better understanding of the principles upon the present invention is based, Table 1 presents data which illustrates the effect of moving the mold wall during various portions of the rise period. The data was obtained with a stationary mold having a movable side relative to the base thereof using reaction products, corresponding to the formulation in the Example 1 above, and which has a rise time of 90 seconds.

Each of the runs set forth in Table 1 were made for the purpose of determining which of the variables are most sensitive. Thus, there was varied the time of upward movement of the wall after the moment of mixing as well as the length and time of upward movement.

Table 1 shows that in each case, the height of the shoulder was increased above that which is normal with a stationary wall so long as the relative movement between the wall and the foam occurred within the last two-thirds of the time period of foam rise. Further, the table indicates that if the relative movement takes place during the second third and preferably with the one-half to two-thirds portion of the foam rise, the foam will reach its maximum height and also have the desired flat top contour.

It is to be noted that when upward pulling started before the reacting products began to rise appreciably, expanding products adhered to the wall and caused a greater skin loss than is the case if the pulling is started after the first one-third of the rise time period.

TABLE 1.—EFFECT OF VARIATION OF RELATIVE WALL MOVEMENT

| Run No. | Start Pulling Sec. After Mix | Stopped Pulling Sec. After Mix | Part of Rise Period of Pulling, Percent | Inches Pulled Up | Ht. Foam When Pull Started, In. | Mean Height, In. | Shoulder Height, In. | Height Above Normal, In. |
|---|---|---|---|---|---|---|---|---|
| C | 15 | 30 | 17.9 to 35.8 | 10 | 1.30 | 9.00 | 10½ | 2.85 |
| D | 35 | 45 | 41.7 to 53.5 | 10 | 4.80 | 10½ | 11½ | 2.60 |
| E | 55 | 62 | 65.5 to 73.8 | 10 | 7.80 | 10.0 | 9¼ | 0.75 |
| F | 45 | 60 | 53.6 to 71.4 | 10 | 5.00 | 8 | 10½ | 3.70 |
| G | 50 | 65 | 59.5 to 77.4 | 3 | 7.00 | 10 | 9 | 0.5 |
| H | 15 | 40 | 17.9 to 47.6 | 3½ | 1.50 | 10¼ | 9½ | 0.78 |
| J | 18 | 42 | 21.4 to 50.0 | 6½ | 1.80 | 9½ | 9½ | 1.43 |
| K | 18 | 63 | 21.4 to 75.0 | 7¾ | 1.80 | 9½ | 10 | 1.93 |
| L | 15 | 64 | 17.9 to 76.2 | 8 | 1.65 | 11½ | 11 | 1.23 |

Rise Time is 90 Sec.

The method disclosed herein is usable with both stationary and continuous translating molding processes. It is conventional in the art today to make polyurethane foam by the continuous casting method. In such a method there is provided a conveyor having a flat bed which is usually caused to translate at a slightly downward angle. A U-shaped molding material, usually kraft paper, is carried on the conveyor and liquid reaction products of the above type formulations are laid down transversely of the translating paper by a reciprocating mixing head. Accordingly, such an apparatus causes newly mixed reaction products to move away from the stationary line of mixing, and such products are contained within the boundaries of the U-shaped paper as they rise.

The use of the invention will be apparent from the following description and drawings which are merely exemplary.

In the drawings:

FIG. 6 is a perspective of an alternate form of apparatus embodying the invention, and in which foam is being made;

Figure 1:
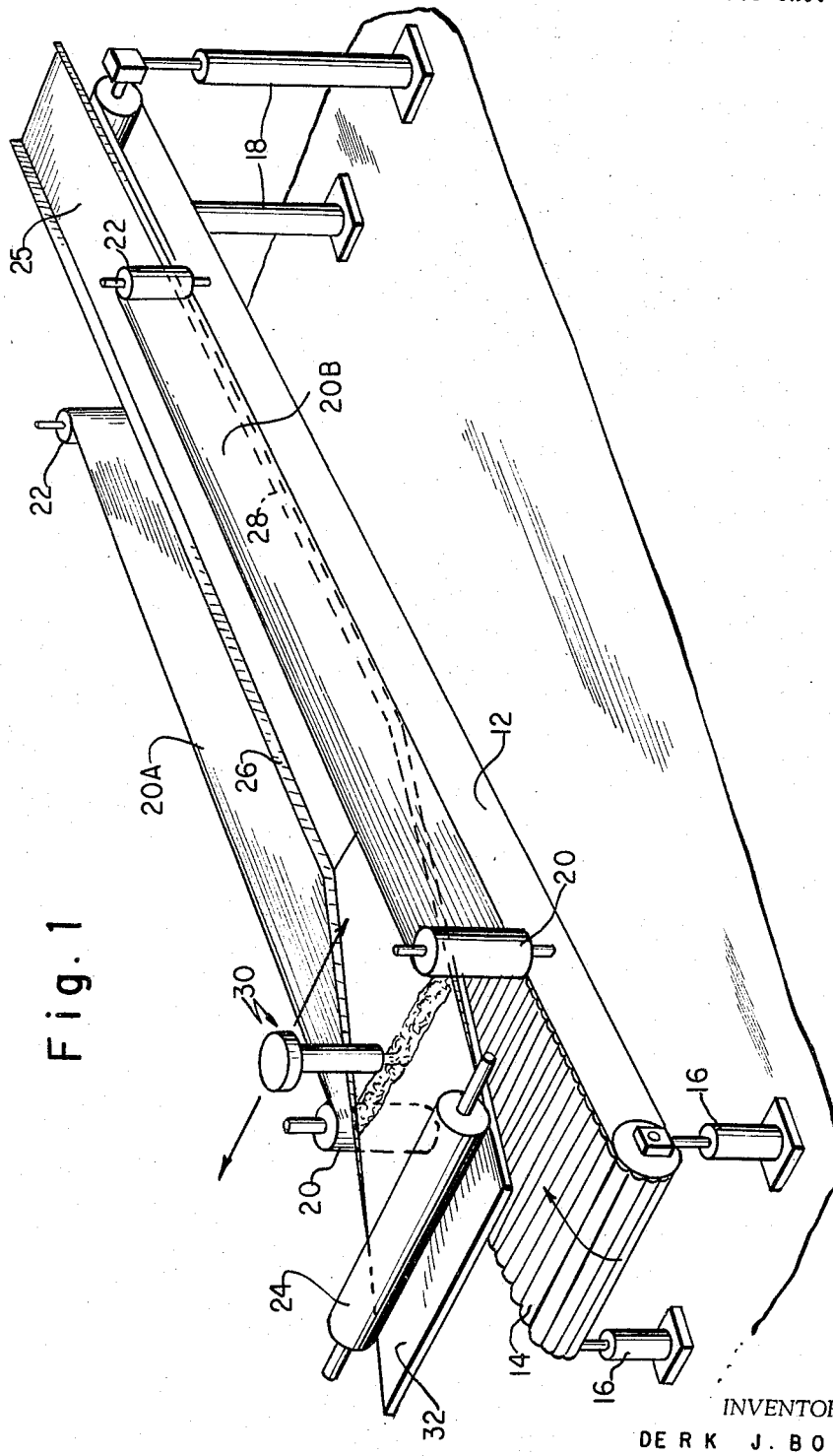
FIG. 1 is a perspective view of one form of apparatus embodying the invention.

The figures illustrate apparatus in which there is a U-shaped mold having a flat bottom and vertical sides which is being continuously and laterally transferred as the reaction products are placed thereon, and which contains them during the time period of their subsequent reaction and free rise to form solidified foam.

In FIGURES 1 through 5, there is shown an improved molding apparatus 10 in which a flat base conveyor 12 is positioned at an incline to the horizontal of 6 degrees. A conventional means not shown, causes the belt 14 of the conveyor to continuously translate in the direction indicated by the arrow on FIG. 1. Adjustable pedestal supports 16, 18 are attached to the conveyor frame and are arranged such that they may be adjusted vertically to vary the inclination of the conveyor as desired.

Vertically upstanding rolls 20 of paper are arranged adjacent the edge of the conveyor 12 such that the paper may be unwound and fed in the direction of the translation of the conveyor in a vertical plane so as to serve as the vertical bounding walls of a mold. There is illustrated two vertically oriented wind-up rolls 22, which receive the ends of the side paper and winds them thereupon adjacent the side of the conveyor, but it should be understood that the side paper, instead of being rolled up, may continue along with the molded foam, and be otherwise disposed of.

A horizontally disposed roll of paper 24 is placed to unwind as a sheet with its outer edges 26, 28 turned slightly upwardly, and flow in the direction of the translation of the conveyor such that the upturned edges 26, 28 overlap and slideably contact the side papers 20A, 20B and thus there is formed a continuous U-shaped translating mold.

At the paper unwinding end of the molding apparatus, there is positioned a mixing nozzle 30, which is arranged to translate along a line which is transverse to the direction of movement of the mold papers and the conveyor during which transversing it discharges mixed chemical reaction products that ultimately result in molded foam. As the mechanism for traversing and otherwise supplying chemicals to this mixing head forms no part of this invention, it has not been shown in the interest of simplifying the illustration.

In accordance with the invention, a pouring board 32 is arranged above one end of the conveyor 12 at an acute The bottom paper 25, which is unwinding from the roll 24 lays flat upon the pouring board 32 and serves as a base for the mold. As it is necessary that the poured chemical reaction products do not flow back against the nozzle, it is conventional for the pouring board and bottom paper 25 to have a slight decline of about 5 degrees for most of the time period of foam rise. Thus, the apparatus of FIGS. 1 to 5 by having the pouring board and base paper 25 translating at an acute angle to the lateral base of direction of the side walls 20A, 20B, provides a means for causing movement in vertical directions relative to the base of the mold, between the walls angle to the line of movement of the side wall 20A, 20B. 20A, 20B and the base paper 25 of the laterally moving mold in some portion of the last two-thirds of the time period of foam rise. Further, it is to be noted that the base of the foam moves downwardly across the moving walls.

Figure 2:
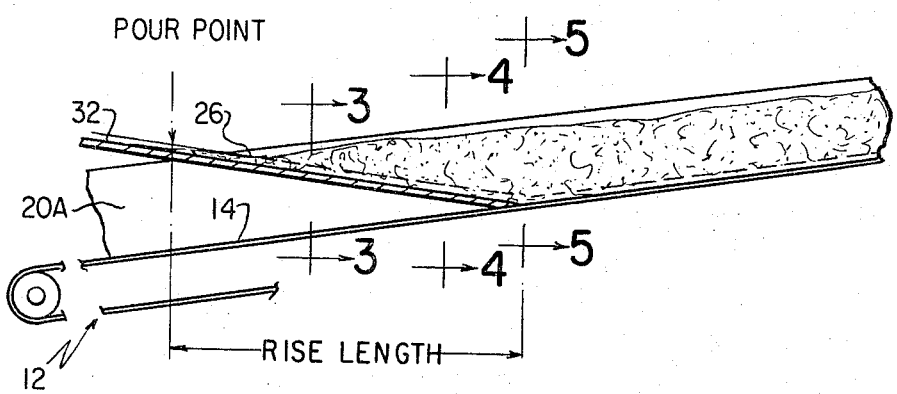
FIG. 2 is a semi-schematice side section of the apparatus of FIG. 1 in which foam is being made.
Figure 3:
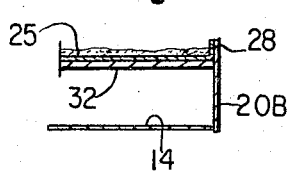
FIG. 3 is a one-half section taken along line 3—3 of FIG. 2.

Accordingly, were one to use the apparatus of FIGS. 1 and 2 to mold the free rising polyurethane foam of the type described in Example 1 above, there would be a time period of foam rise of 1.5 minutes from the moment of mixing to the completion of rise. If the conveyor runs at a speed of 10 feet per minute, the angle of the downward direction of the pouring surface relative to the horizontal is 5°, and with such a foam type, the upward angle of the conveyor to eliminate crest on the foam would be 5 to 7 degrees from the horizontal. Thus, there is an acute angle between the line of direction of the walls of the mold and that of the base of the mold during the time of foam rise.

Figure 4:
FIG. 4 is a one-half section taken along line 4—4 of FIG. 2.
Figure 5:
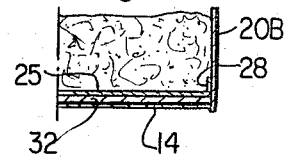
FIG. 5 is a one-half section taken along line 5—5 of FIG. 2.
Figure 7:
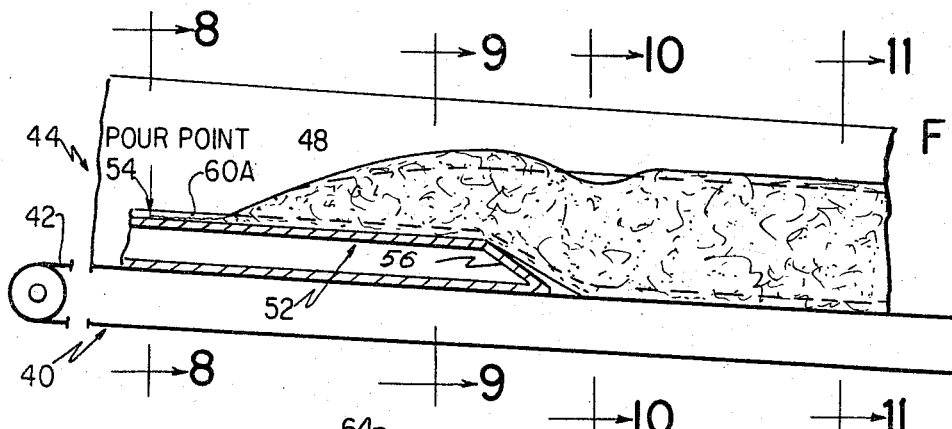
FIG. 7 is a vertical side section of the apparatus of FIG. 6.
Figures 8, 9, 10, 11:
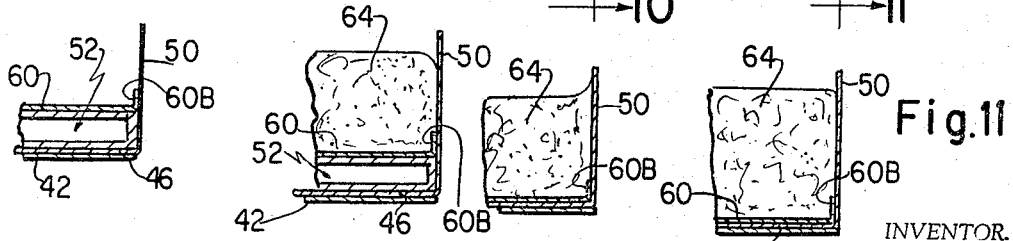
FIG 8 is a one-half section taken along lines 8—8 of FIG. 7.
FIG. 9 is a one-half section taken along lines 9—9 of FIG. 7.
FIG. 10 is a one-half section taken along lines 10—10 of FIG. 7.
FIG. 11 is a one-half section taken along lines 11—11 of FIG. 7.

Upward relative motion of the wall to the rising foam may begin at any time within the time period of foam rise, and with such a conveyor speed, the foam rise would occur over a length of 15 feet from the line of position of the mixing nozzle 30. Additionally, the reaction products are not acted on by the walls 20A, 20B until the foam has risen above the 1½-inch high edges, 26, 28 of the U-shaped bottom paper 25 at which point it has traversed a distance of about 3 feet from the mixing nozzle 30. FIG. 4 is a transverse partial section through the rising foam at approximately 1 foot before the rising foam leaves the downwardly inclined pouring board, and as can be seen, the pouring board 32 extends from the position of the nozzle 30 for a distance of 15 feet, during which time the side papers 20A, 20B, due to their translation along the line of the upwardly inclined conveyor, have a vertical rise component velocity, which can also be considered to be an upward component relative to the top of the rising foam. The upward component can be varied by adjusting the height of the pedestals 18, so that were one to desire a molded foam with a flat top, the pedestals 18 would be raised until the upward velocity component of the side papers 20A, 20B is equal to the rise rate of the top of the foam in the latter two-thirds of its time period, i.e., the last 10 feet of its travel during rise.

It should be noted that the rise rate of polyurethane reaction products is not uniform, and that depending upon the formulation, adjustments in the angle of the conveyor may have to be made so as to control the crest of the desired contour. If the operator notices that a convex crest is occurring, the angle of the conveyor relative to the descending bases of the foam would be increased, possibly to the point where a slight reverse or concave crest appears, so as to allow for the variation in rise rate at the top of the foam.

Generally, it has been found that the vertical component of the side paper should be acting on the foam during at least the last half of its rise period, and that once the foam has completed its rise and the relative movement has ceased, the side paper is only required to support the curing foam.

The distances between the position of pouring or pour point, i.e., mixing nozzle 30, the point of intersection of the pouring board 32 with the conveyor 14 are fixed in relationship to the rise time of the particular type of foam being made, and the speed of the conveyor. Generally, conveyor speed is set by the desired height of foam, taking care not to run so slow as to cause cascading of the rising foam. Accordingly, if one has a particular formulation and knows the rise time for a particular yield height, the conveyor speed and thus, the length of the various parts of the apparatus illustrated in FIGS. 1 to 5 may be easily set.

It has been found that the acute angle that is formed by the plane of the pouring board 32 with the line of direction of the conveyor belt 14 approximates the sum of the rise angle and the angle of the pouring board. The rise angle of the foam being defined by an imaginary line relative to the horizontal, which line is drawn through the point of final rise of translating foam, and the point where the reaction products first begin to expand. This point being conventionally known as the "cream point." The acute angle formed between that line and the horizontal represents the rise angle of the foam. Generally for the example given above, the acute angle that is defined by the intersection of the plane of the conveyor belt and the horizontal is the rise angle of the foam. Under such circumstances, the foam should have a controlled top contour which is essentially flat. If one wishes to have a convex top, the obtuse angle would be made larger, and should one wish to have a concave top, the obtuse angle would be made smaller.

An alternate construction of a translating mold apparatus for carrying out the invention is illustrated in FIGS. 6 through 11, wherein a laterally extending conveyor 40, having a slightly downward incline is arranged to have a belt 42 move along a slightly declined plane. Conventional apparatus not shown provides a U-shaped molding paper 44, having a base 46 and side walls 48, 50. The U-shaped mold paper being arranged to translate at the same rate of speed as a conveyor 40 along the plane of the belt 42. Disposed above one end of the belt and U-shaped mold paper, there is a molding structure 52 in which there is a pouring surface 54 lying in a plane which is vertically spaced above, but parallel to the plane of the conveyor belt 42. On one end of the molding structure 52, there is a steeply inclined portion 56 which goes downwardly from the pouring portion 54, and intersects the line of the plane of the U-shaped molding paper as it lays on the top of the conveyor. The inclined portion 56 is referred to hereinafter as the "drop."

Indicated on FIG. 6, there is a dashed line which represents the reciprocating motion line of the conventional mixing nozzle and a second laterally spaced dotted line representing the beginning of the foam rise or cream point.

From a roll not shown, a mold base sheet 60 is laid on to the top of the molding structure 52 with slightly turned up edges 60A, 60B, adapted to overlap the sides 48 and 50 of the U-shaped molding paper 46, the base material 60 having the function to receive the liquid reaction products and hold them during their initial rise period. This material is arranged to be translated over the pour surface 54 by apparatus (not shown) at a velocity equal to that of the U-shaped paper 46. It has been found that pliable or very flexible materials such as thin sheets of polyethylene make a satisfactory mold base sheet 60.

The drop 56 of the molded structure 52 is arranged to start after the rising foam exceeds the height of the edges 60A, 60B of the bottom sheet 60, so that the translating sides 48, 50 of the U-shaped mold paper act to give an upward drag on the sides of the foam as the base thereof is rapidly dropped thereacross. Further, the drop 56 is arranged to begin during the latter two-thirds of the time period of foam rise, and preferably, the drop incline intersects with the plane of the conveyor 42 just prior to the moment of completion of rise of the foam. Accordingly, using the foam of Example 1 above, the intersection of the drop 56 with the plane of the conveyor belt 42 would be something less than 15 feet from the pour line of the mixing nozzle when the conveyor speed is 10 feet per minute. Further, the angle of the drop incline relative to the plane of the conveyor is approximately equal to the rise angle of that foam. Therefore, the obtuse angle formed by the intersection of the plane of the conveyor belt 42 and the plane of the drop 58 has a supplementary angle which is equal to the rise angle of the foam.

There can be different effects on the contour of the top of the risen foam, depending upon when and how long the relative motion of the side walls is maintained and the following example demonstrates the effectiveness of one form of apparatus as shown in Pages 6 to 10:

A reaction mixture of the urethane of Example 1 above, if poured at a rate of 50 lbs./minute on the translating mold base paper 60 which is moved at a rate of 10 ft./minute will yield a rise height of 2.5 ft. This height is based on the typical yield factor of 0.94 which accounts for loss of chemicals of gas losses.

This formulation has a cream time of 0.1 minute so that actual rise occurs over 1.4 minutes or 14 feet of distance. Tests showed (see Table 1) that the relative upward drop on the rising foam should occur in the latter two-thirds of the foam rise period. As the relative movement here is to be obtained by rapid dropping of the base, it has been found that the rapid drop should start at the point of one-half rise on 8 feet from the pour point.

The initial pouring is done as the mold base material 60 passes over the pour surface 54 which is declined at 5° to the horizontal. At the point of 8 ft. from the pour point, the foam has risen 15 inches and as the side walls 60A, 60B move in the same direction, a crest has formed of approximately 20% of the height. Accordingly, the shoulder height is 12 inches and to eliminate the crest, the height of the foam at its center has to equal the shoulder height, so the required drop would be 30 minus 12 or 18 inches. This drop would have to occur in the remaining 7 feet of lateral distance to be within the rise period of the foam. This, the drop angle is determined by those dimensions and is an angle whose tangent is drop height/distance of rise or $1.5/7 = .214$ or $12°$, relative to pour surface 54.

FIGS. 8 through 11 show the effect that the drop has on the rising foam 64. Thus, one can see that the drop can not be made too early because the rising foam may not yet have generated sufficient resistance to flow, and would thus cascade down the steep incline of the drop. However, for the drop to be most efficient, the acute angle that it makes with the conveyor plane should at least approximate the rise angle of the foam, and the point of intersection or apex of that angle should be just prior to the moment of final rise of the foam. In the apparatus of FIGS. 6 to 11, if one wishes to produce a top contour of foam which is convex, the angle of the drop would be less than the rise angle, and conversely, if one wished to approach a concave top, the drop would be greater than the rise angle, keeping in mind that the positioning of the drop must be such that the resistance to flow of the rising foam prevents it from cascading down the drop.

It should be also recognized that drops of three-quarters of ultimate foam height down to something approaching one-quarter of such height may be made as desired by the operator, depending upon the type of foam contour which one desires. Preferably, however, the cessation of drop should be during the final stages of foam rise. Thus, the drop would begin to occur between one-third and two-thirds of the time period of rise for any particular foam.

This invention, having recognized certain characteristics of rising foam, utilizes these characteristics to provide a method for controlling the top contour of the rising polyurethane foam as well as apparatus specifically arranged to carry out the process on a translating mold process.

A further important feature of the present invention is that not only does the method and apparatus yield a more desirable shape of the risen foam, but it also increases the total size of foam block. This increase in yield for a given quantity of reaction products appears to be due to the lessening of the crest with the attendant lessening of the amount of skin in that area. However, suffice to say, that by the present apparatus and method, a higher foam block of more useful configuration can be obtained.

Although the various features of the invention have been shown as applied to several embodiments of the invention, it will be evident that changes may be made in such details and certain features may be used without others without departing from the principles of the invention.

What is claimed is:

1. In the method of molding free-rising polyurethane in a laterally translating U-shaped mold in which the sides of the rising foam are vertically acted on during the time period of foam rise by separately vertically movable side walls, the improvement of causing the vertical pull on the sides of said rising foam by translating the body of said rising foam downwardly at an acute angle to the line of direction of said side walls during the final two-thirds of said time period.

2. In a mold for the continuous molding of free-rising polyurethane foam in which there is a laterally translatable U-shaped mold adapted to receive the liquid reaction products and contain them during the time period of their subsequent reaction and free rise to solidified foam and having separately movable portions of side walls to impart vertical pull on the sides of the rising foam, the improvement comprising a base for said U-shaped mold as a continuously translating bottom sheet with slightly turned up edges arranged to move downwardly from the horizontal and said vertically movable side wall portions being arranged to translate in a line of direction at an acute angle to said base of said mold.

3. A mold according to claim 2 having means to vary said acute angle as desired to control the contour of the top of said rising foam.

References Cited
UNITED STATES PATENTS

| 2,753,277 | 7/1956 | Smithers | 264—54 XR |
| 2,827,665 | 3/1958 | Rogers et al. | 264—54 |
| 3,091,811 | 6/1963 | Hackert | 264—48 XR |
| 3,123,856 | 3/1964 | Dye et al. | 264—47 |
| 3,152,361 | 10/1964 | Edwards | 264—54 XR |
| 3,249,486 | 5/1966 | Voisinet et al. | 264—54 |

ALEXANDER H. BRODMERKEL, *Primary Examiner.*

P. E. ANDERSON, *Assistant Examiner.*